(12) United States Patent
Saida

(10) Patent No.: US 8,749,181 B2
(45) Date of Patent: Jun. 10, 2014

(54) BICYCLE REGENERATIVE BRAKE CONTROL DEVICE

(75) Inventor: Takao Saida, Osaka (JP)

(73) Assignee: Shimano Inc., Osaka (JP)

( * ) Notice: Subject to any disclaimer, the term of this patent is extended or adjusted under 35 U.S.C. 154(b) by 458 days.

(21) Appl. No.: 13/155,603

(22) Filed: Jun. 8, 2011

(65) Prior Publication Data

US 2011/0304288 A1    Dec. 15, 2011

(30) Foreign Application Priority Data

Jun. 11, 2010 (JP) ................................. 2010-134554

(51) Int. Cl.
*H02P 3/14* (2006.01)

(52) U.S. Cl.
USPC ........................................... 318/376; 318/375

(58) Field of Classification Search
USPC ................... 318/139, 375, 376; 180/218, 220
See application file for complete search history.

(56) References Cited

U.S. PATENT DOCUMENTS

| | | | | |
|---|---|---|---|---|
| 3,921,741 A | * | 11/1975 | Garfinkle et al. | 180/206.2 |
| 4,095,663 A | * | 6/1978 | Gaffney | 180/205.1 |
| 5,764,009 A | * | 6/1998 | Fukaya et al. | 318/300 |
| 5,799,562 A | * | 9/1998 | Weinberg | 92/12.2 |
| 6,320,336 B1 | * | 11/2001 | Eguchi | 318/139 |
| 6,874,592 B2 | * | 4/2005 | Yokotani et al. | 180/206.2 |
| 7,040,440 B2 | * | 5/2006 | Kurita et al. | 180/206.5 |
| 2007/0126284 A1 | * | 6/2007 | Swain et al. | 303/152 |

FOREIGN PATENT DOCUMENTS

| | | |
|---|---|---|
| JP | 3515156 B2 | 8/1995 |
| JP | 9-254861 A | 9/1997 |
| JP | 2002-255080 A | 9/2002 |
| JP | 4124411 B2 | 4/2003 |
| JP | 3882993 B2 | 7/2003 |
| JP | 2006-15887 A | 1/2006 |
| JP | 2010-35376 A | 2/2010 |

* cited by examiner

Primary Examiner — Rina Duda
(74) Attorney, Agent, or Firm — Global IP Counselors

(57) ABSTRACT

A bicycle regenerative brake control device is provided for controlling a motor, in relation to a brake mechanism that can be mounted on an electric bicycle in which human-powered driving is assisted by the motor. The bicycle regenerative brake control device basically includes a first control part, a second control part and a switch control part. The first control part controls the motor so as to generate a uniform first regenerative braking force. The second control part controls the motor so as to generate a gradually increasing second regenerative braking force upon determining the brake mechanism shifts from an initial state to a braking state. The switch control part switches to a control performed by the second control part in response to the brake mechanism shifting from the initial state to the braking state while control is being performed by the first control part.

12 Claims, 11 Drawing Sheets

BICYCLE REGENERATIVE BRAKE CONTROL DEVICE

CROSS-REFERENCE TO RELATED APPLICATIONS

This application claims priority under 35 U.S.C. §119 to Japanese Patent Application No. 2010-134554, filed Jun. 11, 2010. The entire disclosure of Japanese Patent Application No. 2010-134554 is hereby incorporated herein by reference.

BACKGROUND

1. Field of the Invention

The present invention relates to a brake control device, and in particular to a brake device that can be mounted on an electric bicycle in which human-powered driving is assisted by a motor, and to a bicycle regenerative brake control device for controlling the motor.

2. Background Information

There are known in the art techniques for performing regenerative braking in order to suppress consumption of battery power in power-assisted bicycles in which human-powered driving is assisted by a motor (for example, see News release, Sanyo Electric Co., Ltd, online, URL: http://jp.sanyo.com/news/2010/03/02-1/html). In a conventional regenerative brake device, a brake lever is provided with a sensor for detecting whether or not a lever has been operated. When the brake lever is operated, brake regeneration is performed, and regenerative charging is performed. When a downhill gradient is detected, regenerative charging is performed. Even on flat ground, regular regeneration, which generates a small regenerative braking force, is performed and rotational charging is performed.

SUMMARY

In the conventional configuration described above, charging is performed by regular regeneration, downhill regeneration, and brake regeneration in situations other than uphill. Therefore, compared to a case in which regenerative charging is performed by downhill regeneration and brake regeneration only, there are more opportunities for regenerative charging, and the charging efficiency is higher.

However, when brake regeneration is performed by operating the brake lever, the regenerative braking force is constant. As a result, regenerative charging during brake regeneration cannot be performed in an efficient manner.

One object of the present disclosure is to make it possible to perform efficient regenerative charging using brake regeneration in a regenerative brake control device that performs regular regeneration and brake regeneration.

In accordance with a first aspect of the present disclosure, a bicycle regenerative brake control device is proposed for controlling a motor, in relation to a brake mechanism that can be mounted on an electric bicycle in which human-powered driving is assisted by the motor. The bicycle regenerative brake control device basically comprises a first control part, a second control part and a switch control part. The first control part controls the motor so as to generate a uniform first regenerative braking force. The second control part controls the motor so as to generate a gradually increasing second regenerative braking force upon determining the brake mechanism shifts from an initial state to a braking state. The switch control part switches to a control performed by the second control part in response to the brake mechanism shifting from the initial state to the braking state while control is being performed by the first control part.

In this regenerative braking control device of the first aspect, regenerative charging by the first control part, in which a uniform first regenerative braking force is generated, is performed irrespective of the state of the brake mechanism, i.e., irrespective of whether mechanical braking by the brake mechanism is being performed. The first regenerative braking force is a braking force that is set to a level that does not adversely affect normal travel. When the brake mechanism is shifted from the initial state to the braking state while control is being performed by the first control part, e.g., when a brake lever is operated, a switch is made to a control performed by the second control part, and regenerative charging is performed by the second regenerative braking force that gradually increases. Therefore, the charging amount becomes greater than regenerative charging by the first regenerative braking force. Therefore, the regenerative charging amount during brake regeneration increases, and it becomes possible to perform regenerative charging by brake regeneration in an efficient manner.

In accordance with a second aspect of the present disclosure, the bicycle regenerative brake control device of the first aspect is further configured such that the second control part is configured to control the motor according to operation of a bicycle brake lever as the brake mechanism. In such a case, when control is being performed by the second control part, operation of the brake lever, e.g., movement position of the brake lever, controls the motor. Therefore, operation of the brake lever causes the second regenerative braking force to gradually increase, and it becomes possible to increase the second regenerative braking force in a smooth manner.

In accordance with a third aspect of the present disclosure, the bicycle regenerative brake control device of the first or second aspect is further provided with a mode switch part that switches between a first braking mode and a second braking mode, the first braking mode being performed such that the first control part generates the uniform first regenerative braking force until the brake mechanism shifts from the initial state to the braking state and then the switch control part switches to the control performed by the second control part, and the second braking mode being performed such that no regenerative braking is performed until the brake mechanism shifts from the initial state to the braking state and then the switch control part switches to the control performed by the second control part. In this case, in the first braking mode, the first regenerative braking force is used to perform regular regenerative braking and to perform regenerative charging, and when the brake mechanism is changed from the initial state to an operating state, the gradually increasing second regenerative braking force is used to perform regenerative braking, and the regenerative charging amount is caused to increase. In contrast, in the second braking mode, no regenerative braking is performed while the brake mechanism is in the initial state, and when the brake mechanism shifts from the initial state to the operating state, the gradually increasing second regenerative braking force is used to perform braking and to perform regenerative charging. Here, the charging amount can be adjusted to suit the preference of the rider. For example, it is possible, when the remaining battery level is low, for the first braking mode to be enabled and the charging amount increased, and when the remaining battery level is high, for the second braking mode to be enabled and for it to be made possible to pedal with less effort when the brake mechanism is not operating.

In accordance with a fourth aspect of the present disclosure, the bicycle regenerative brake control device of the second or third aspect is further provided with a movement position detecting part and a position determining part. The movement position detecting part detects a movement position of the brake lever from an initial position. The position determining part determines whether the movement position of the brake lever from the initial position has exceeded a predetermined position. The switch control part controls the motor so that the first control part generates the first regenerative braking force until the movement position of the brake lever exceeds the predetermined position. The switch control part controls the motor so that the second control part generates the second regenerative braking force when the movement position of the brake lever exceeds the predetermined position. In this circumstance, until the movement position of the lever member of the brake lever exceeds the predetermined position, the first control part performs regenerative braking using the uniform first regenerative braking force. When the movement position exceeds the predetermined position, the second control part performs regenerative braking using the second regenerative braking force that gradually increases according to the movement position. Since motor control is switched according to the movement position of the lever member, switching of the regenerative braking force can be performed in a smooth manner.

In accordance with a fifth aspect of the present disclosure, the bicycle regenerative brake control device of the fourth aspect is further configured such that the second control part is configured to control the motor so that the second regenerative braking force gradually increases according to the movement position of the brake lever from the initial position. In this circumstance, the second regenerative braking force increases according to the position of movement from the initial position. Therefore, a setting in which the second regenerative braking force when the lever member is at the predetermined position is equal to the first regenerative braking force makes it possible to change the regenerative braking force, without causing discomfort, from the first regenerative braking force generated by the first control part to the second regenerative braking force generated by the second control part.

In accordance with a sixth aspect of the present disclosure, the bicycle regenerative brake control device of the fourth or fifth aspect is further configured such that the position determining part is configured to determine the movement position of the brake lever at which the second regenerative braking force exceeds the first regenerative braking force as the predetermined position. In this circumstance, the movement position at which the uniform first regenerative braking force becomes equal to the second regenerative braking force that gradually increases from the initial position is determined as the predetermined position. In a circumstance in which, e.g., duty control is used to set the regenerative braking force, the predetermined position is determined to be when the duty ratios become equal. Therefore, even when the initial position of the lever member changes, the second regenerative braking force becomes increasingly greater than the first regenerative braking force.

In accordance with a seventh aspect of the present disclosure, the bicycle regenerative brake control device of the fourth aspect is further configured such that the second control part is configured to control the motor so that the second regenerative braking force becomes increasingly greater than the first regenerative braking force according to at least the movement position of the brake lever from the predetermined position. In this circumstance, even if the predetermined position is fixed between the initial position and a position at which the brake mechanism starts braking, the second regenerative braking force becomes increasingly greater than the first regenerative braking force with respect to the predetermined position. Also, a setting can be made so that the second regenerative braking force increases with respect to the predetermined position, rather than the initial position, making it possible to simplify control.

Accordingly, when regular regenerative braking using the uniform first regenerative braking force is being performed irrespective of the state of the brake mechanism, and regenerative charging is being performed with respect to a power source, and the brake mechanism shifts from the initial state to the braking state, regenerative charging using a gradually increasing, variable second regenerative braking force is performed. Therefore, the regenerative charging amount during brake regeneration increases, and it becomes possible to perform regenerative charging using brake regeneration in an efficient manner.

Various objects, features, aspects and advantages of the bicycle regenerative brake control device will become apparent to those skilled in the art from the following detailed description, which, taken in conjunction with the annexed drawings, discloses two illustrative embodiments of a bicycle regenerative brake control device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
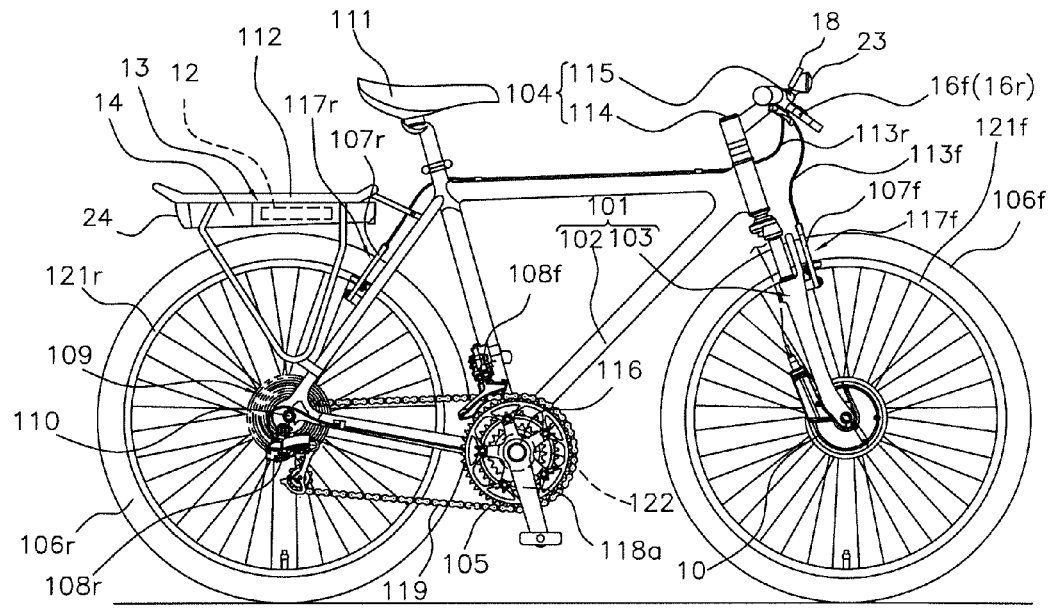
FIG. 1 is a right side elevational view of a bicycle that is equipped with a bicycle regenerative brake control device in accordance with one embodiment.
Figure 2:
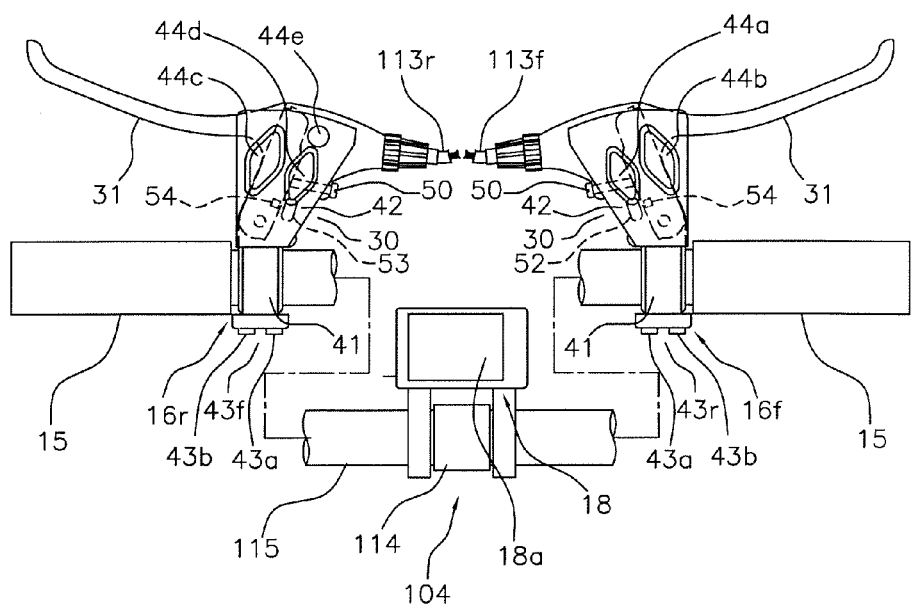
FIG. 2 is a top plan view of a front portion of the bicycle illustrated in FIG. 1 showing a pair of brake levers and a display device mounted to the handlebar.

Referring initially to FIGS. 1 and 2, a bicycle is illustrated which is equipped with a power-assisted bicycle in which human-powered driving is assisted by a motor-integrated hub or motor unit 10 in accordance with one illustrated embodiment. In the following description, the terms "left" and "right" of the bicycle are defined so that when the bicycle is viewed from the rear, the rightward direction is defined as the right, and the leftward direction is defined as the left.

The bicycle includes a frame 101 having a frame body 102 and a front fork 103 with a handle part 104. The bicycle further includes a drive part 105, a front wheel 106f, a rear wheel 106r, a front braking device 107f, a rear braking device 107r, a headlamp 23 and a tail light 24. The front fork 103 is mounted to a front part of the frame body 102 so as to pivot around an inclined axis. The front brake device 107f performs braking by coming into contact with and applying a braking force to a front rim 121f of the front wheel 106f. The rear brake device 107r performs braking by coming into contact with and applying a braking force to a rear rim 121r of the rear wheel 106r.

A variety of parts including a saddle 111 and the handle part 104 are attached to the frame 101. The drive part 105 includes a front derailleur 108f, a rear derailleur 108r and a gear set 109 mounted on a rear hub 110 of the rear wheel 106r. The drive part 105 also includes a crank shaft 116 supported by a hanger part of the frame body 102 in a rotatable manner. The drive part 105 further includes a gear crank 118a and a left crank (not shown) that are secured to both ends of the crank shaft 116. The drive part 105 has a chain 119 provided around the gear crank 118a and the gear set 109.

In the front derailleur 108f, the chain 119 is engaged around one of, e.g., three sprockets mounted on the gear crank 118a. In the rear derailleur 108r, the chain 119 is engaged around one of, e.g., nine sprockets of the gear set 109 attached to the rear hub 110. The front derailleur 108f and the rear derailleur 108r are both electrically driven.

A rear carrier 112 is attached to an upper rear part of the frame body 102. A rear carrier unit 13 is mounted on the rear carrier 112. The rear carrier unit 13 includes an overall control part 12. The rear carrier unit 13 is attachably/detachably equipped with a power-storing part 14 that functions as a power source for a motor unit 10 described further below. The rear carrier unit 13 is attachably/detachably equipped with the overall control part 12, the headlamp 23 and other components. The power-storing part 14 includes, e.g., a nickel hydrogen battery, a lithium ion battery, or another battery. The tail light 24 is integrally attached to the power-storing part 14.

Figure 5:
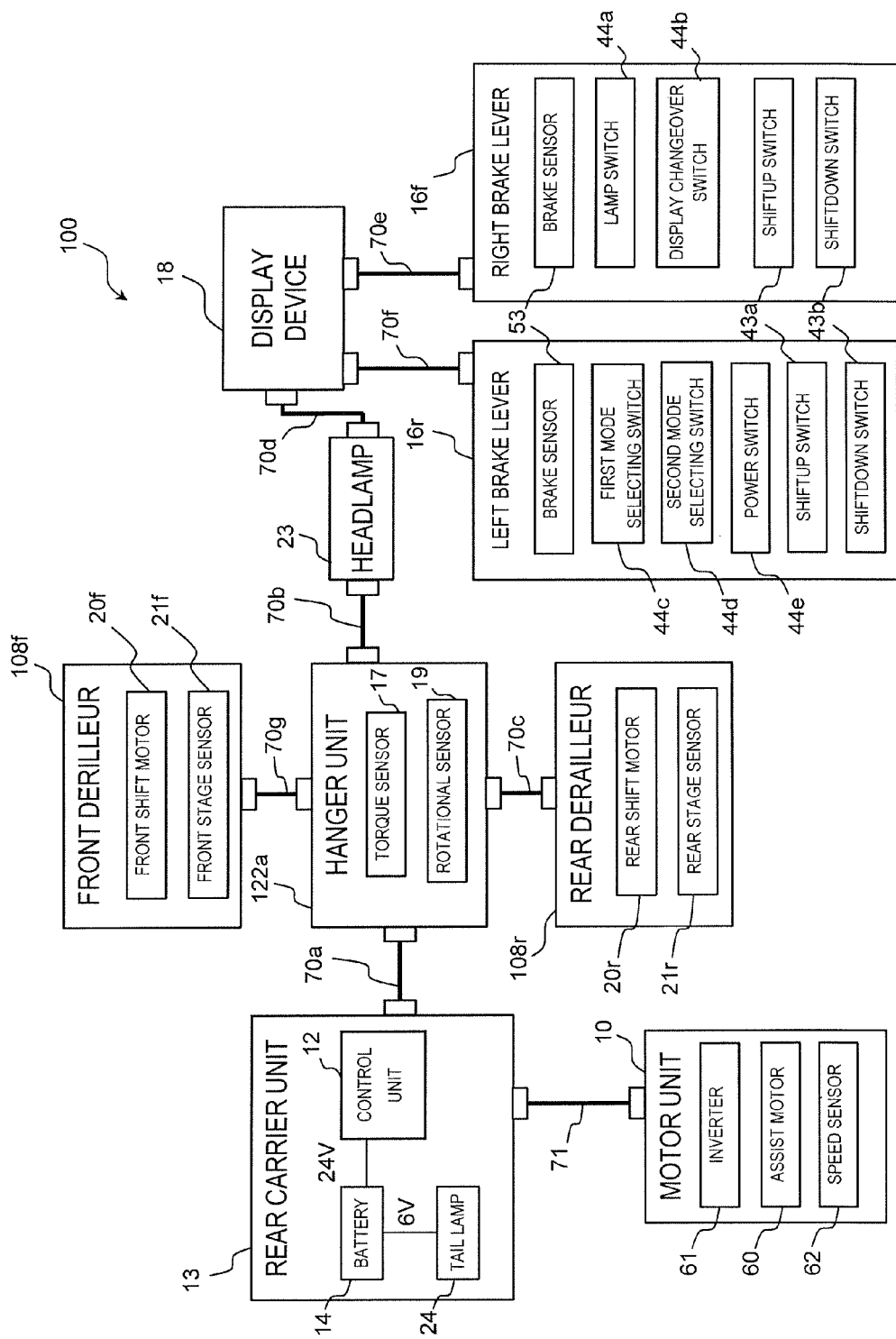
FIG. 5 is schematic block diagram showing an entire configuration of an electrical system for the bicycle regenerative brake control device of the illustrated embodiments.

The motor unit 10 is mounted on the center of the front wheel 106f for assisting the driving of the front wheel 106f. As shown in FIG. 5, an assist motor 60, an inverter 61, and a speed sensor 62 are provided within the motor unit 10. The assist motor 60 is, e.g., a 3-phase brushless DC motor or an AC motor. The inverter 61 converts a DC current outputted from the power-storing part 14 to an AC current for generating an assist force in accordance with the assist mode of the assist motor 60. The inverter 61 also changes the regenerative braking force of the assist motor 60. The inverter 61 changes the duty ratio to change the assist force and the regenerative braking force. The speed sensor 62 detects the speed of rotation of the assist motor 60, i.e., the speed of the bicycle.

As shown in FIG. 5, the hanger part 122 is provided with a hanger unit 122a. The hanger unit 122a includes a torque sensor 17 for detecting pedalling force acting on the crank shaft 116. The hanger unit 122a also includes an angle sensor 19 for detecting the rotation angle of the crank shaft 116.

The rear carrier unit 13 has the overall control part 12 provided within. The overall control part 12 includes a microcomputer, and controls electrical components that are connected. The overall control part 12 is capable of controlling the motor unit 10 so that an assist force of a maximum of N1 times larger than the pedalling force applied by the rider is generated. The overall control part 12 controls the assist motor 60 through a plurality of regenerative braking modes and a plurality of assist modes. Specifically, the overall control part 12 has three assist modes: a strong assist mode, in which assistance is provided by an assist force of N1 times the pedalling force; a medium assist mode, in which assistance is provided by an assist force of N2 times the pedalling force; and a weak assist mode, in which assistance is provided by an assist force of N3 times the pedalling force. The team N1, N2, and N3 represent a predetermined number, selected so that N1 is larger than N2 and N2 is larger than N3. For example, 2 is selected as N1, 1.5 is selected as N2, and 1 is selected as N3.

Also, with regards to regenerative braking modes, the overall control part 12 has two braking modes: a regular regeneration mode (i.e., an example of a first braking mode); and a brake regeneration mode (i.e., an example of a second braking mode) in which braking force is changed according to the movement position of a lever member 31 of a right brake lever 16f described further below. The overall control part 12 also has an operation mode of the motor unit 10 and a disabled mode in which neither assisting nor regenerative braking is performed. In the regular regeneration mode, when the lever member 31 of the right brake lever 16f is moved from the initial position, a control is performed by the uniform first regenerative braking force until the predetermined position is reached. When the predetermined position is exceeded, a control is performed by the second regenerative braking force, in which the braking force by regenerative braking increases according to the movement position of the lever member 31. In the brake regeneration mode, no regular regeneration is performed, and control is performed by the second regenerative braking force according to the movement position of the lever member 31 of the right brake lever 16f. In the regular regeneration and the brake regeneration braking modes, braking is applied to the front wheel 106f while electrical power generated in the assist motor 60 is stored in the power-storing part 14.

The handle part 104 includes a handle stem 114 secured to an upper part of the front fork 103, and a bar-handle-shaped handlebar 115 secured to the handle stem 114. As shown in FIG. 2, which shows the handle part 104 as viewed from above, a right brake lever 16f, a left brake lever 16r, and a grip 15 are provided to ends of the handlebar 115. A display part 18 is secured to a center part of the handlebar 115 so as to straddle the handle stem 114. The display part 18 includes a liquid crystal display screen 18a. The liquid crystal display screen 18a can be switched between, e.g., an assist screen shown in FIG. 3 for displaying, e.g., a screen for selecting between assist or regenerative braking modes, and a cycle computer screen shown in FIG. 4 for displaying the speed of the bicycle, the shift position of the front derailleur 108f and the rear derailleur 108r, travel distance, and other information. Both screens show the remaining battery level in the power-storing part 14. In the assist screen shown in FIG. 3, it is possible to select, for example, two regenerative braking modes and three assist modes, as well as a disabled mode in which neither assisting nor regenerative braking is performed. When an up mode selection switch 44c or a down mode selection switch 44d described further below is operated, a cursor moves up or down. Then, when no switch is operated for more than several seconds, the mode corresponding to the cursor position is selected. The cursor also becomes stationary at the selected mode.

Figure 3:
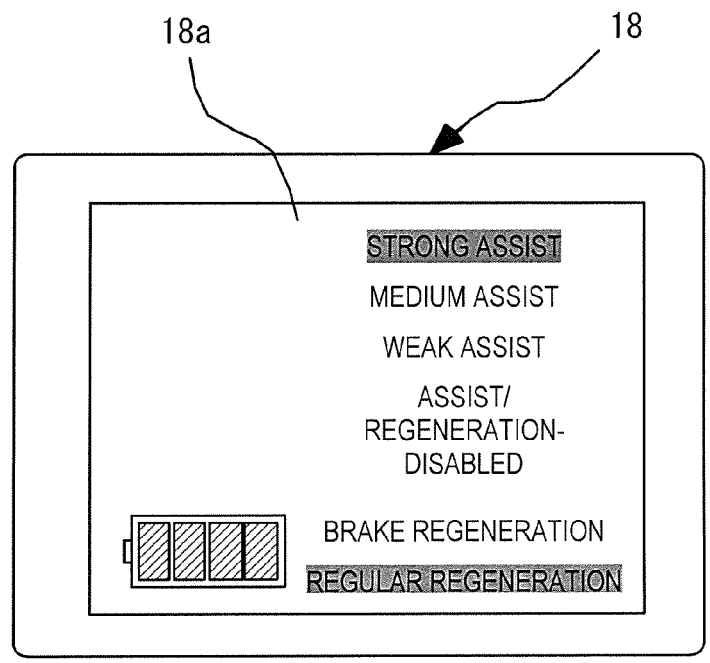
FIG. 3 is a diagrammatic drawing showing an example of a mode screen being displayed on the display device.

In the assist screen shown in FIG. 3, the assist mode is set to the strong assist mode, and the regenerative braking mode is set to the regular regeneration mode. Therefore, in a circumstance in which the assist mode and the regenerative braking mode have been selected, two cursors are displayed. However, in a circumstance in which the assist/regeneration-disabled mode is selected, the assist/regeneration-disabled mode is indicated by the cursor.

Also, on the cycle computer screen, the cursor for the shift position shows the current shift position.

The right brake lever 16f is connected to the front brake device 107f by a front brake cable 113f. The left brake lever 16r is connected to the rear brake device 107r by a rear brake cable 113r. The right brake lever 16f and the front brake device 107f form a front brake mechanism 117f. The left brake lever 16r and the rear brake device 107r form a rear brake mechanism 117r. Each of the right brake lever 16f and the left brake lever 16r includes a mounting bracket 30 that is detachably mounted on the handlebar 115, and the lever member 31 that is swingably mounted on the mounting bracket 30.

As shown in FIG. 2, the mounting bracket 30 includes a mounting part 41 arranged at the lower portion of FIG. 2 so as to be mountable on the handlebar 115, and a bracket part 42 connected to the mounting part 41. The mounting part 41 can be used to secure the mounting bracket 30 to the handlebar 115 by tightening a fixing screw (not shown). A rear shift control part 43r and a front shift control part 43f for shift operation in the rear derailleur 108r and the front derailleur 108f are attached to the bracket part 42 of the right brake lever 16f and the left brake lever 16r so as to be capable of being individually attached or detached.

Each of the rear shift control part 43r and the front shift control part 43f includes a shift-up switch 43a and a shift-down switch 43b arranged, e.g., next to each other in a lateral direction. The shift-up switch 43a is arranged, e.g., further inward relative to the shift-down switch 43b. The shift-up switch 43a is a switch for shifting to a higher-speed shift stage, and the shift-down switch 43b is a switch for shifting to a lower-speed shift stage. For example, operating the shift-up switch 43a of the front shift control part 43f shifts the chain 119 in the gear crank 118a from a sprocket that has the smallest diameter to a sprocket that has a medium diameter, or from the sprocket that has the medium diameter to a sprocket that has the largest diameter. Also, operating the shift-up switch 43a of the rear shift control part 43r shifts the chain 119 in the small gear 109 to a sprocket that is one step smaller in diameter than the sprocket around which the chain 119 is engaged. An opposite operation is performed when the shift-down switch 43b is operated.

A light switch 44a and a display changeover switch 44b are arranged next to each other in the lateral direction on the bracket part 42 of the right brake lever 16f. The display changeover switch 44b is a switch for switching the liquid crystal display screen 18a of the display part 18 between the assist screen and the cycle computer screen. The light switch 44a is a switch for switching the forward-illuminating light 23 on or off. Each time the light switch 44a is operated by pressing, the headlamp 23 switches on or off. Each time the display changeover switch 44b is operated by being pressed, the liquid crystal display screen 18a of the display part 18 is switched between the assist screen and the cycle computer screen.

The up mode selection switch 44c, the down mode selection switch 44d, and a power switch 44e are arranged on the bracket part 42 of the left brake lever 16r. The up mode selection switch 44c is a switch for selecting the regenerative braking mode and the assist mode in sequence in the upward direction of the screen shown in FIG. 3. The down mode selection switch 44d is a switch for selecting a plurality of regenerative braking modes or a plurality of assist modes in sequence in the downward direction of the screen shown in FIG. 3. The power switch 44e is a circular press-button switch arranged further upward of the down mode selection switch 44d in FIG. 2, and is a software switch for switching the power of the overall control part 12 on or off. Each time the up mode selection switch 44c is pressed, a cursor for selecting the regenerative braking control part or the assist mode moves in sequence in the upward direction of the screen. When the cursor stops moving, the corresponding mode will be selected. The down mode selection switch 44d similarly moves the cursor in sequence downwards. Although in the drawing, the modes displayed on the display screen are arranged in the vertical direction, the modes may also be displayed so as to be arranged in the lateral direction. Each time the power switch 44e is operated by being pressed, the power of the overall control part 12 is switched on or off.

The bracket part 42 is provided with an initial position adjusting part 50 having an adjusting bolt capable of adjusting the initial position of the lever member 31. Also, a brake sensor (i.e., an example of a movement position detecting part) 53 in which a linear Hall element is used, the linear Hall element being for detecting, from the distance relative to the lever member 31, the position of movement of the lever member 31 from the initial position, is provided within the bracket part 42. The brake sensor 53 has the linear Hall element 55 for detecting, from the distance relative to a magnet 54 embedded in the lever member 31, the position of movement of the lever member 31 from the initial position. When the brake regeneration mode and the regular regeneration mode have been selected, the overall control part 12 performs regenerative braking control according to the movement position.

The lever member 31 is mounted on the bracket part 42 so as to be capable of swinging between the initial position and the maximum swing position. The initial position is the position at which the lever member 31 is the furthest from the handlebar 115.

The lever member 31 is urged towards the initial position by an urging member (not shown). The initial position can be adjusted by the initial position adjusting part 50 as described further above. An inner cable of the front brake cable 113f (or the rear brake cable 113r) is latched onto the lever member 31. An outer casing of the front brake cable 113f (or the rear brake cable 113r) is latched onto the bracket part 42.

Figure 6:
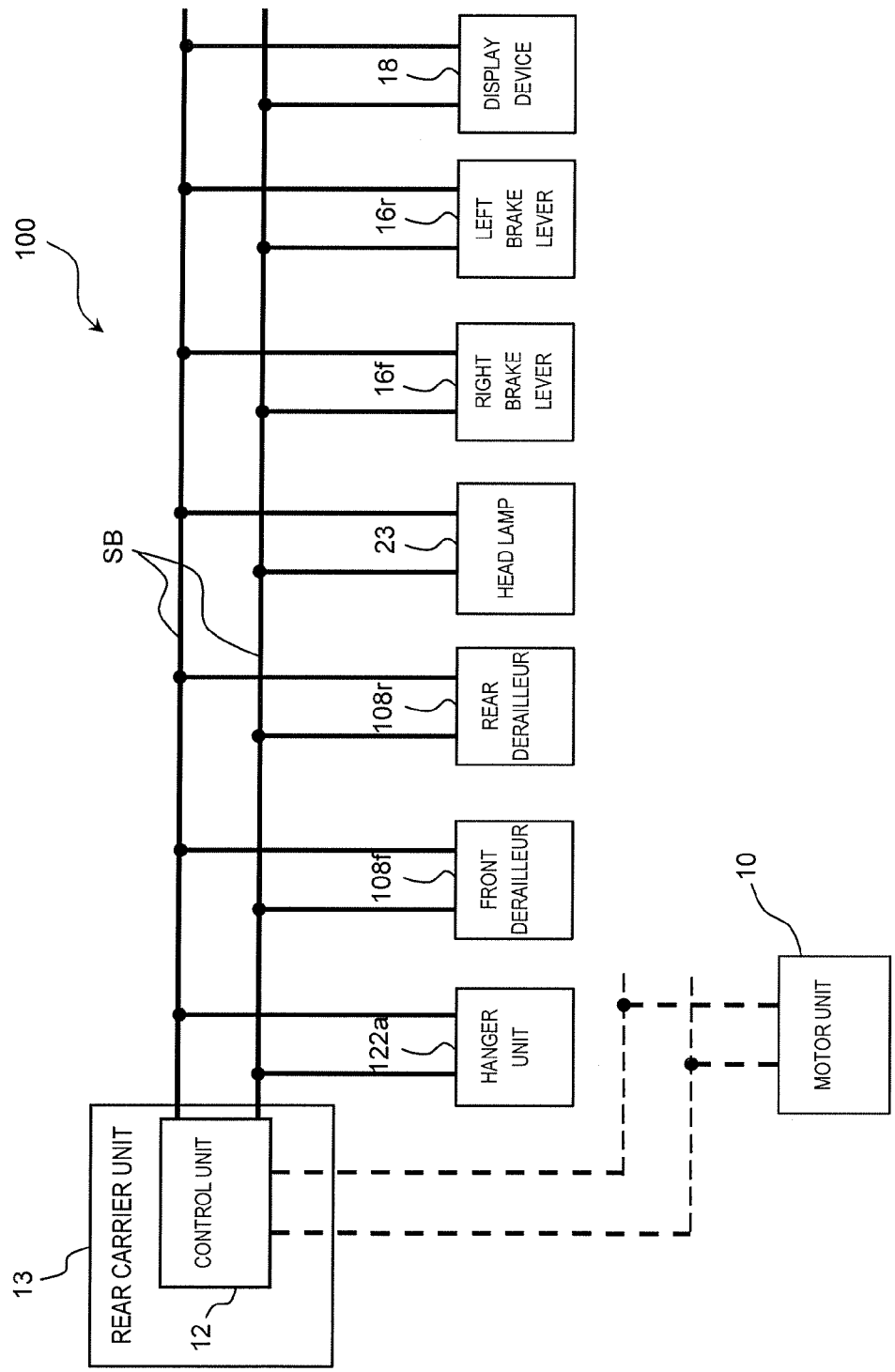
FIG. 6 is a schematic block diagram showing an electrical connection scheme of the bicycle electrical system for the control part or unit of the bicycle regenerative brake control device.

As shown in FIGS. 5 and 6, an electrical system 100 to be installed on a bicycle includes, as electrical components, the rear carrier unit 13, the motor unit 10, the hanger unit 122a, the front derailleur 108f and the rear derailleur 108r, the headlamp 23, the display part 18, and the right brake lever 16f and the left brake lever 16r. The electrical components are connected by first power lines 70a through 70g and a second power line 71, through which communication can be transmitted. In FIG. 5, each of the first power lines 70a through 70g is represented by a solid line, and the second power line 71 is represented by a line that is thicker than the lines representing the first power lines 70a through 70g. The first power lines 70a through 70g and the second power line 71 are formed so as to include two conducting wires. One of the two wires is a ground wire.

The rear carrier unit 13 includes the overall control part 12 for controlling the electrical components of the electrical system 100, the power-storing part 14, and the tail light 24. The rear carrier unit 13 is mounted on the rear carrier 112. The overall control part 12 includes a microcomputer. The power-storing part 14, which is a power source for the electrical system 100, is detachably mounted on the overall control part 12. The tail light 24 is integrally attached to the power-storing part 14.

The motor unit 10 is connected to the rear carrier unit 13 with the second power line 71 interposed therebetween. The second power line 71 is a power line through which a supply current of, e.g., 24 V can be passed. The first power lines 70a through 70g are power lines through which a supply current of, e.g., 6V can be passed.

A supply current superimposed with a control signal for controlling respective corresponding electrical components flows through the first power lines 70a through 70g and the second power line 71.

The hanger unit 122a is connected to the rear carrier unit 13 with the first power line 70a interposed therebetween. As described further above, the hanger unit 122a includes the torque sensor 17 and the angle sensor 19. The headlamp 23, the front derailleur 108f, and the rear derailleur 108r are individually connected to the hanger unit 122a with the first power line 70b, the first power line 70g, and the first power line 70c respectively interposed therebetween. The headlamp 23 is, e.g., a power-saving type in which an LED (i.e., a light-emitting element) is used. The headlamp 23 is mounted on a front surface of the front fork 103.

The front derailleur 108f includes a front shift motor 20f and a front stage sensor 21f. The rear derailleur 108r includes a rear shift motor 20r, a and a rear stage sensor 21r, respectively. Each of the front derailleur 108f and the rear derailleur 108r respectively includes a front control part and a rear control part (not shown), for controlling the shift motor 20f and the rear shift motor 20r respectively. Output from the front stage sensor 21f and the rear stage sensor 21r respectively causes the shift stage of the front derailleur 108f and the rear derailleur 108r to be displayed on the display part 18. The display part 18 is connected to the headlamp 23 with the first power line 70d interposed therebetween.

The right brake lever 16f and the left brake lever 16r are connected to the display part 18 with the first power line 70e and the first power line 70f respectively interposed therebetween.

As shown in FIG. 6, each of the electrical components is connected in a serial bus structure. The electrical system 100 is thereby capable of operating whether or not any of the electrical components are connected, with the exception of electrical item in which the overall control part 12 is installed (e.g., the rear carrier unit 13). For example, in FIG. 6, even if the headlamp 23 is removed, if the first power line 70b is connected to the display part 18, the electrical system 100 will operate. Also, in a circumstance in which the front derailleur 108f and the rear derailleur 108r operate using a regular shift cable, the first power line 70g and the first power line 70c are removed. Similarly, in such a circumstance, the electrical system 100 will operate.

Figure 7:
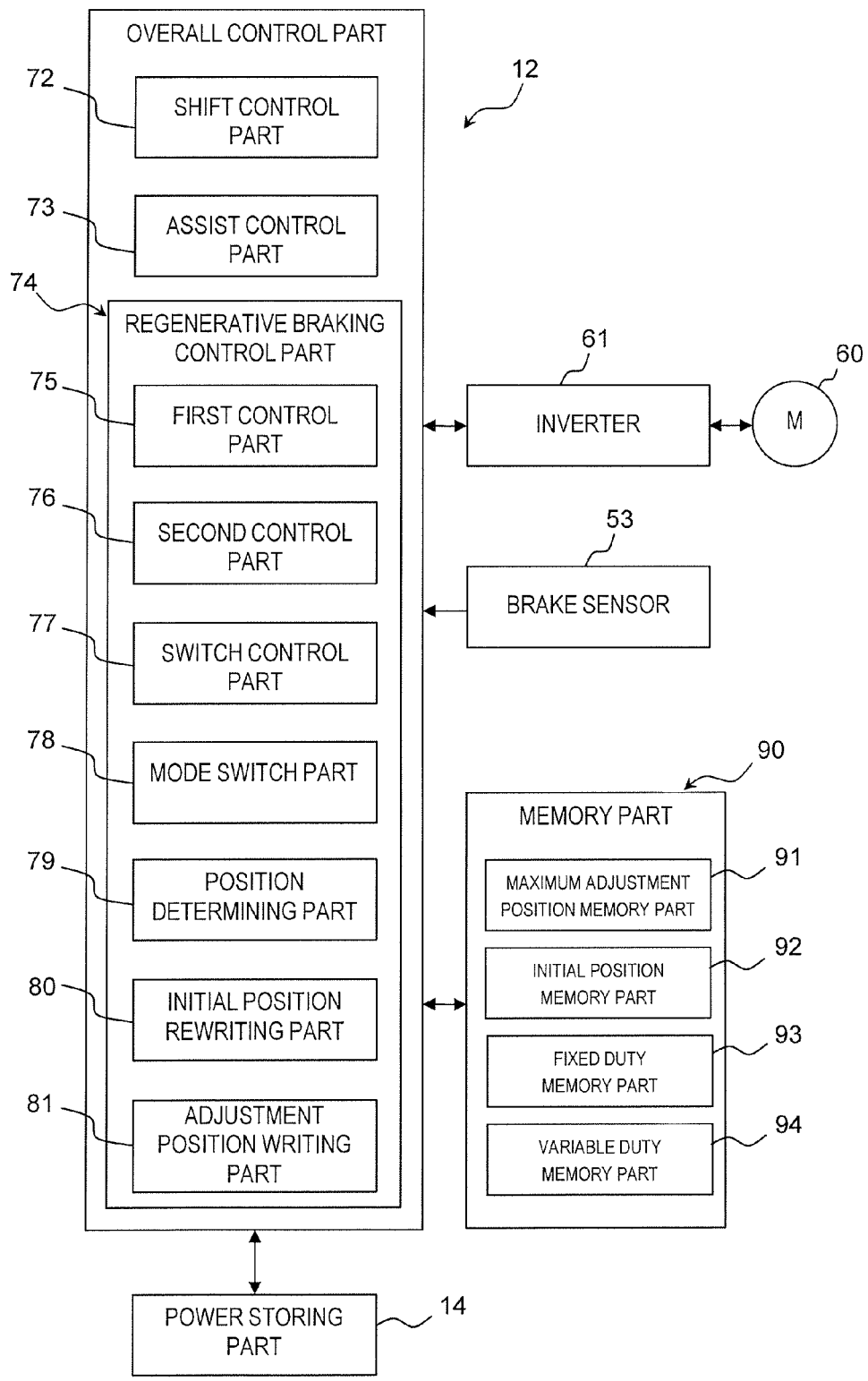
FIG. 7 is a block diagram showing a configuration of functions of an overall control part of the bicycle regenerative brake control device.

As shown in FIG. 7, the overall control part 12 includes, as a configuration of functions obtained using software, a shift control part 72, an assist control part 73, and a regenerative braking control part (i.e., an example of a regenerative braking control device) 74. The regenerative braking control part 74 includes a first control part 75, a second control part 76, a switch control part 77, a mode switch part 78, a position determining part 79, an initial position rewriting part 80, and an adjustment position writing part 81. A memory part 90, in addition to the power-storing part 14, the motor unit 10, and other electrical components described further above, is connected to the overall control part 12. The memory part 90 includes, e.g., an electrically erasable programmable read only memory (EEPROM), a flash memory, or another non-volatile memory element; and has a maximum adjustment position memory part 91, an initial position memory part 92, a fixed duty memory part 93, and a variable duty memory part 94.

A movement position corresponding to a maximum initial position that has been adjusted using the initial position adjusting part 50 is stored in the maximum adjustment position memory part 91. This storage process may be performed during factory shipment, or may be performed by the retailer or the rider. In a circumstance in which the initial position has been amended, the initial position that has been amended using a regenerative braking mode process described further below is stored in the initial position memory part 92. When the bicycle is first purchased, the first initial position is a position that has not yet been adjusted by the initial position adjusting part 50; in a circumstance in which the movement position is represented numerically, the initial position corresponds to e.g., a movement position of "0."

The fixed duty memory part 93 stores a fixed duty FD for generating a first regenerative braking force BF1, which is used while the regular regeneration mode is engaged. The variable duty memory part 94 stores a variable duty CD for generating a second regenerative braking force BF2, which gradually increases according to the position of movement M of the lever member 31 from the initial position during brake regeneration. The variable duty CD is stored in the variable duty memory part 94 in, e.g., in table format in which the variable duty CD is calculated for each movement position M according to a function f(M) of the movement position M. Therefore, the variable duty CD can be read from the movement position M.

Figure 11:
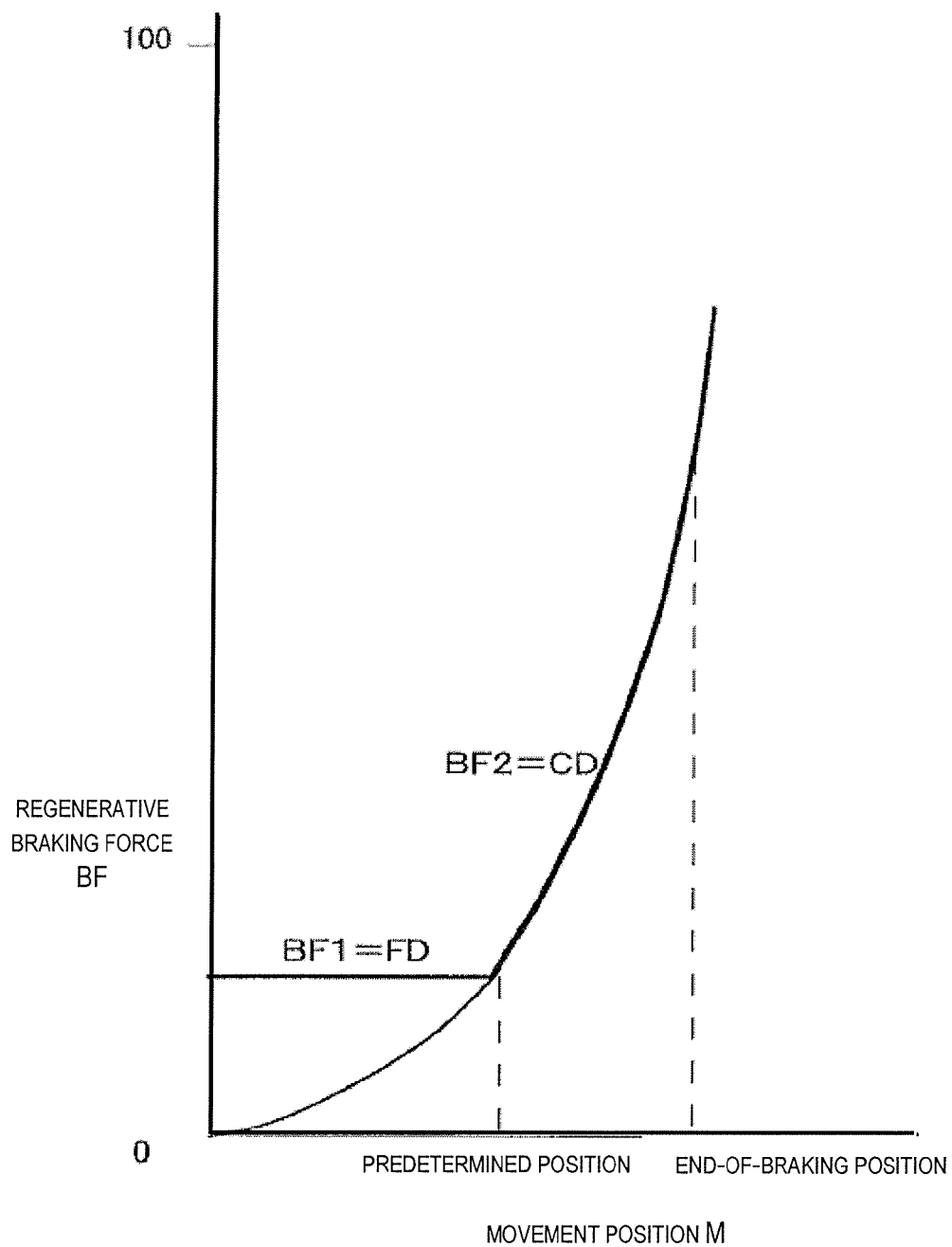
FIG. 11 is a graph showing a change in the regenerative braking force during brake regeneration and during regular regeneration.

For example, as shown in FIG. 11, the fixed duty FD is a duty ratio of, e.g., 3% to 20% when maximum regenerative braking force (duty ratio: 100) is applied. The variable duty CD is a duty ratio that gradually increases from the initial position, with an upper limit being 100%. In the example shown in FIG. 11, movement of the lever member 31 stops before the upper limit is reached. Therefore, the second regenerative braking force BF2 is equal to or less than 100%. Also, the curve representing the variable duty CD in FIG. 11 is a curve in which the rate of increase grows with increasing movement position M.

The shift control part 72 controls the shift stages of the front derailleur 108f and the rear derailleur 108r according to operation of the left and right shift-up switches 43a and the left and right shift-down switches 43b. The assist control part 73 controls the assist motor 60 via the inverter 61 in an assist mode selected using the up mode selection switch 44c and the down mode selection switch 44d. The regenerative braking control part 74 controls the assist motor 60 via the inverter 61 in a regenerative braking mode (i.e., either the regular regeneration mode or the brake regeneration mode) selected using the up mode selection switch 44c and the down mode selection switch 44d.

The first control part 75 controls the assist motor 60 so that a uniform first regenerative braking force is generated. The second control part 76 controls the assist motor 60 so that when the front brake mechanism 117f shifts from the initial state to the braking state, the gradually-increasing second regenerative braking force is generated. Specifically, the second control part 76 controls the assist motor 60 so that when the lever member 31 moves from the initial position (i.e., an example of the initial state), the second regenerative braking force, which gradually increases according to the movement position, is generated. An example of the first regenerative braking force and the second regenerative braking force is shown in FIG. 11. In FIG. 11, the first regenerative braking force BF1 generated by the assist motor 60 due to a control performed by the first control part 75 is uniform. The second regenerative braking force BF2 generated by the assist motor 60 due to a control from the second control part 76 is represented by, e.g., a function f(M) of the movement position M, and gradually increases with increasing movement position M. If the lever member 31 moves from the initial position beyond the predetermined position when a control by the first control part 75 is being performed in the regular regeneration mode, the switch control part 77 switches to a control performed by the second control part 76. The mode switch part 78 switches the regenerative braking mode to either the regular regeneration mode or the brake regeneration mode. Specifically, the mode switch part 78 activates the regenerative braking mode that has been selected using the up mode selection switch 44c and the down mode selection switch 44d. The position determining part 79 determines whether the position of movement of the lever member 31 from the initial position has exceeded the predetermined position.

When the initial position adjusting part 50 is used to amend the initial position, the initial position rewriting part 80 rewrites information stored in the initial position memory part 92 with a movement position after adjustment. Specifically, when the linear Hall element 55 detects a movement position that is smaller than the maximum adjustment position, the initial position rewriting part 80 stores the movement position in the initial position memory part 92 as an initial position, and rewrites the initial position. When, e.g., the initial position adjusting part 50 is used to adjust the maximum initial position, the adjustment position writing part 81 stores, as the maximum adjustment position, the movement position when one of the switches 44a through 44e is pressed and held for, e.g., two seconds or more; or two or more switches are operated simultaneously; or a similar operation is performed, in the maximum adjustment position memory part 91.

Figure 9:
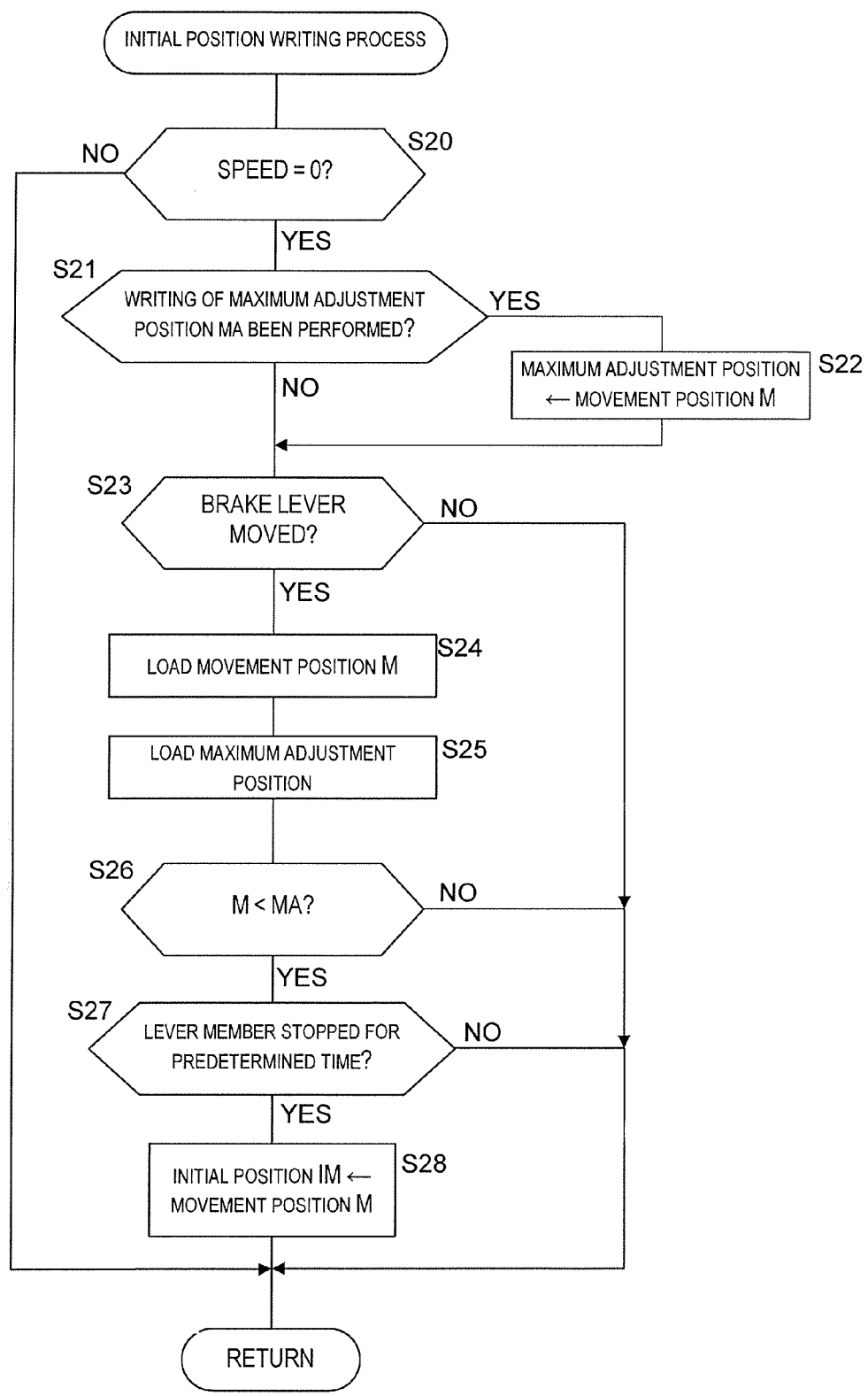
FIG. 9 is a flow chart showing an operation of an initial position rewriting part of the bicycle regenerative brake control device.
Figure 10:
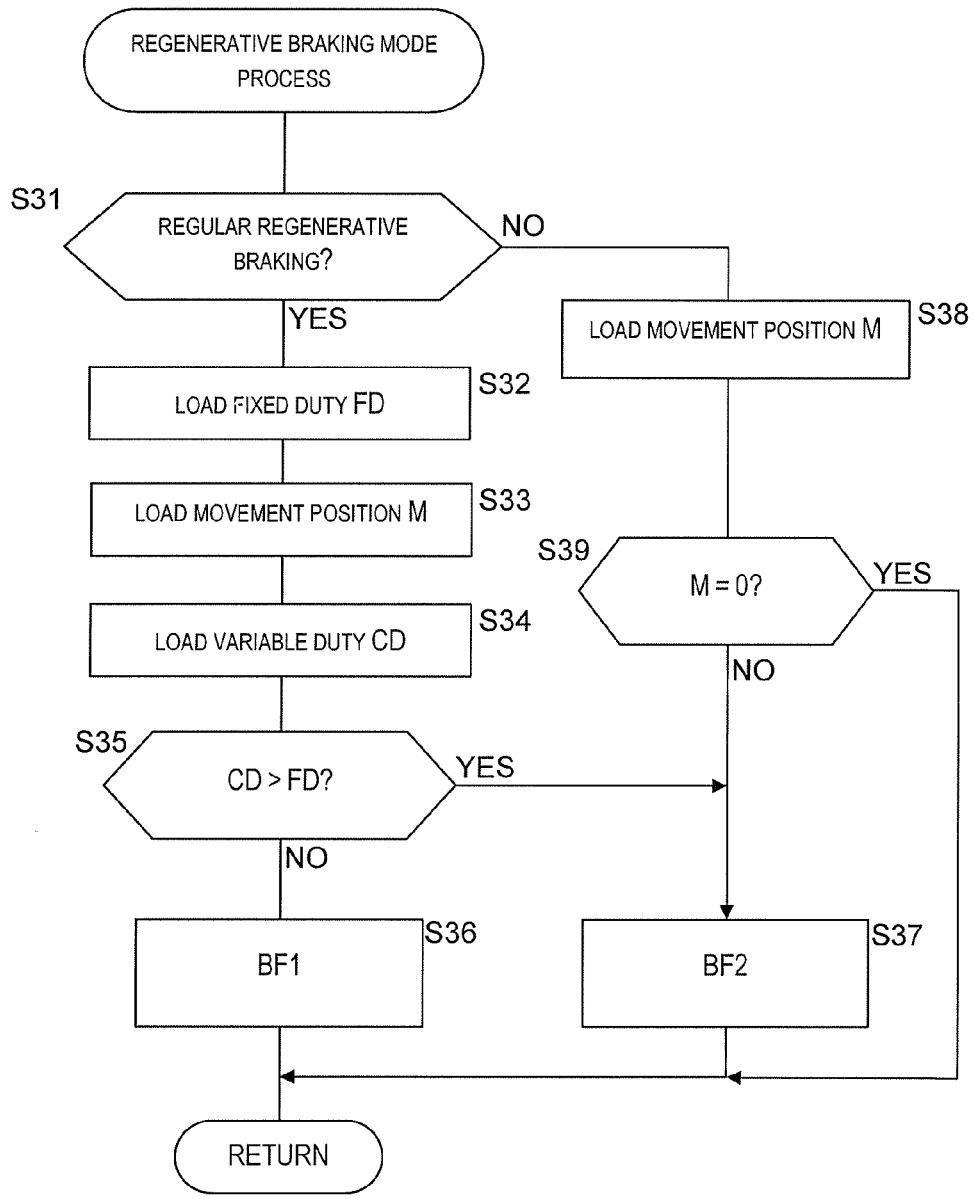
FIG. 10 is a flow chart showing a regenerative braking control operation executed by the bicycle regenerative brake control device.

Next, a control operation of the regenerative braking control part 74 will be described with reference to control flow charts shown in FIGS. 8 to 11. With regards to the control operation, the process shown in FIGS. 9 to 11 is an example of the control operation of the present invention, and is not intended to limit the scope of the present invention. In the following description, a description will be given for an example in which brake regeneration is performed according to the movement position of the right brake lever 16f for performing braking operation of the front brake device 107f for the front wheel 106f.

When electrical power from the power-storing part 14 is fed to the overall control part 12, the overall control part 12 launches the control operation.

Figure 4:
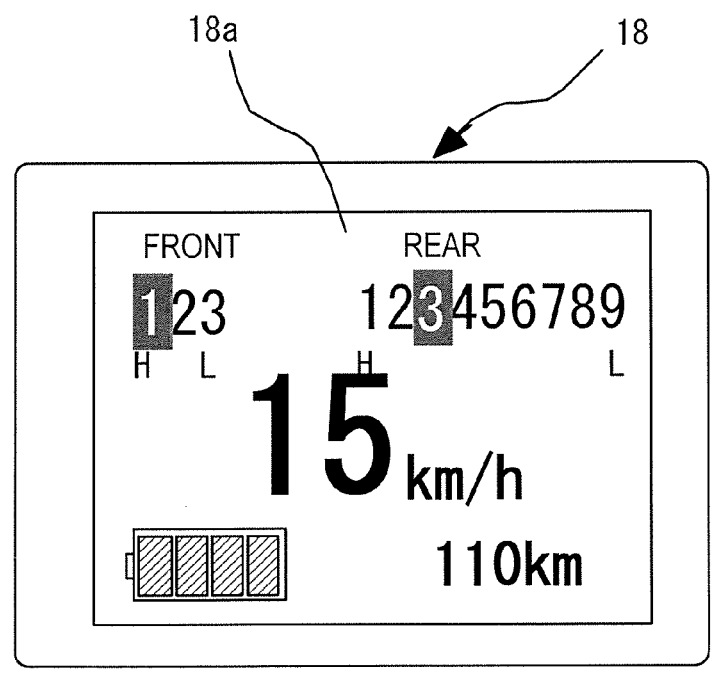
FIG. 4 is a drawing showing an example of a cycle computer screen being displayed on the display device.
Figure 8:
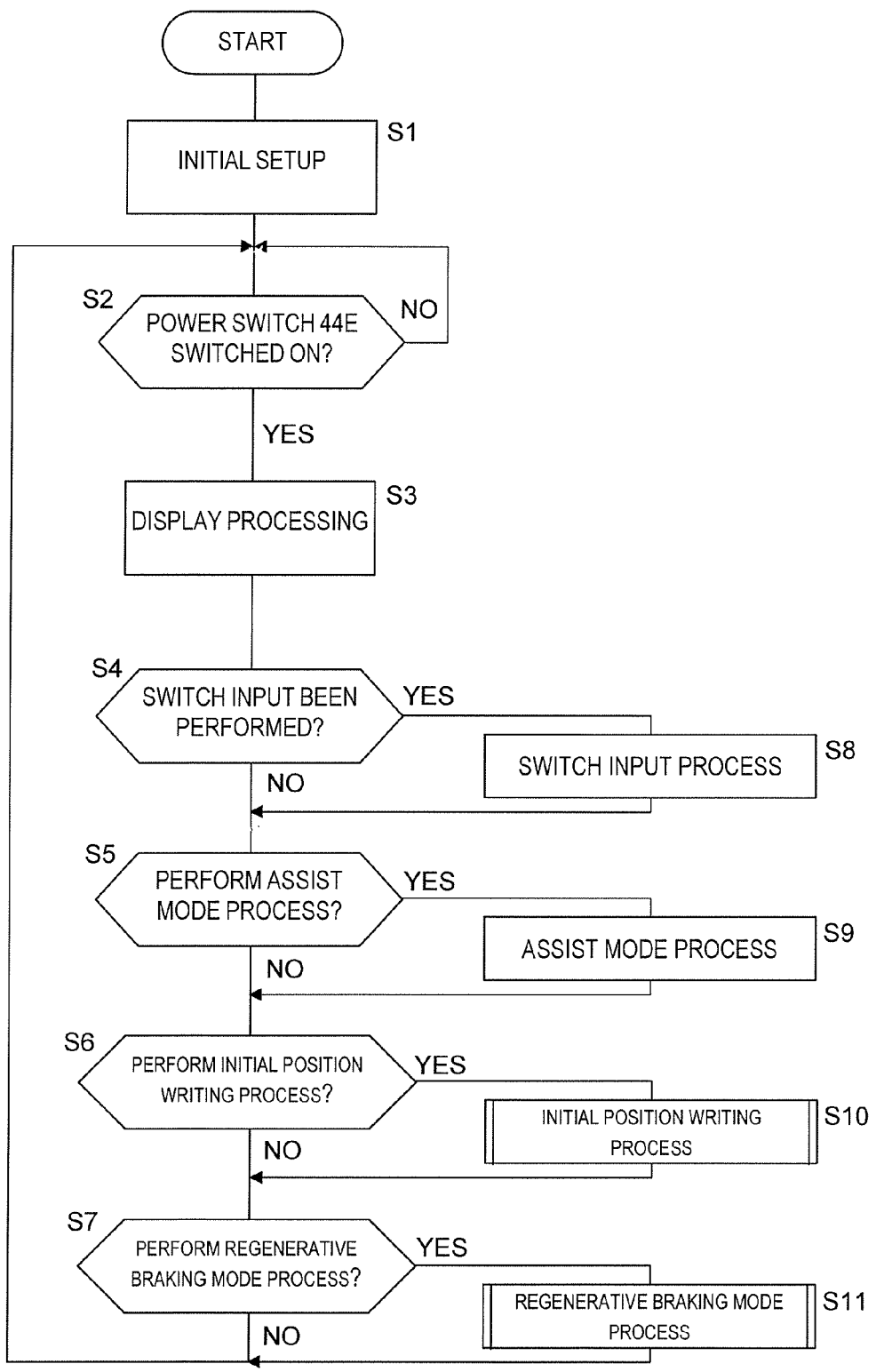
FIG. 8 is a flow chart showing a control operation executed by a regenerative braking control part of the bicycle regenerative brake control device.

In step S1 in FIG. 8, initial setup is performed. In the initial setup, a variety of variables and flags are reset. In step S2, the flow stands by for the power switch 44e to be switched on. When the power switch 44e is switched on, the control process proceeds to step S3. In step S3, the display on the display part 18 is processed. At this step, either the assist screen shown in FIG. 3 or the cycle computer screen shown in FIG. 4 is displayed according to operation of the display changeover switch 44b. A variety of display processes are also performed. Step S4 determines whether switch input has been performed. Step S5 determines whether to execute the assist mode. Step S6 determines whether the initial position has been amended and whether to perform the initial position writing process. Step S7 determines whether to perform the regenerative braking process, and the control process proceeds to step S2.

If it has been determined that switch input has been performed, the control process proceeds from step S4 to step S8. At step S8, a switch input process is performed, and the control process proceeds to step S5. In the switch input process, a process is performed according to the switch that has been operated. For example, in the assist screen shown in FIG. 3, when the up mode selection switch 44c is operated, a cursor displayed on either the three assist modes and the two regenerative braking modes displayed on the right side of the screen, or on the assist/regeneration off mode, moves upwards by one step each time the up mode selection switch 44c is pressed. Also, when the down mode selection switch 44d is pressed, the cursor moves downwards by one step each time the switch is pressed. When a predetermined time (e.g., 2 to 5 seconds) has elapsed after the cursor has been moved, the assist mode and the regenerative braking mode that have been selected are set, and the cursor becomes fixed at the assist mode and the regenerative braking mode that have been set.

If it is determined that the assist mode is to be executed, the control process proceeds from step S5 to step S9. In step S9, an assist process is performed in the assist mode selected during the switch input process, and the control process proceeds to step S6. In the assist mode, the assist motor 60 generates an assist force according to an assist mode selected from "strong", "medium", or "weak;" and assists human-powered driving by the rider.

If it is determined that the initial position rewriting process is to be performed, the control process proceeds from step S6 to step S10. At step S10, an initial position rewriting process shown in FIG. 9 is performed, and the control process proceeds to step S7.

If it is determined that the regenerative braking process is to be performed, the control process proceeds from step S7 to step S11. At step S11, the regenerative braking mode shown in FIG. 10 is performed, and then the control process proceeds to step S2.

In the initial position rewriting process in step S10, it is determined in step S20 in FIG. 9, from an output from the speed sensor 62, whether the speed of the bicycle is "0." If the speed is not "0", the flow returns to the main routine shown in FIG. 8. If the speed is "0", the control process proceeds to step S21.

In step S21, it is determined whether the lever member 31 has been adjusted to the maximum adjustment position by the initial position adjusting part 50 and an operation for writing the maximum adjustment position has been performed. This determination is made by, e.g., simultaneous operation of the light switch 44a and the display changeover switch 44b. If the determination is "YES", the control process proceeds to step S22. In step S22, the current movement position M of the lever member 31 detected by the linear Hall element 55 of the right brake lever 16f is written as the maximum adjustment position MA to the maximum adjustment position memory part 91, and the control process proceeds to step S23. In step S23, it is determined whether the lever member 31 has moved. If it has not moved, the flow returns to the main routine shown in FIG. 8. If it has moved, the control process proceeds to step S24. In step S24, the movement position M is loaded from the linear Hall element 55. In step S25, the maximum adjustment position MA is read from the maximum adjustment position memory part 91. In step S26, it is determined whether the movement position M that has been loaded is smaller than the maximum adjustment position MA, i.e., whether the movement position M relates to the initial position adjusting part 50 having been operated to adjust the initial position.

If it has been determined that the movement position M is smaller than the maximum adjustment position MA and relates to an operation of adjusting the initial position, the control process proceeds from step S26 to step S27. In step S27, it is determined whether the lever member 31 has been stationary for a predetermined time (e.g., 2 seconds) or longer. This is a process for cancelling the movement position during adjustment. If the lever member 31 has not been stationary for the predetermined time, the flow returns to the main routine. If the lever member 31 has been stationary for the predetermined time or longer, the control process proceeds from step S27 to step S28. In step S28, the current movement position M detected by the linear Hall element 55 is saved in the initial position memory part 92 as an initial position IM. The initial position IM of the lever member 31 is thereby amended in the brake regeneration mode.

If it has been determined that the movement position M is greater than the maximum adjustment position MA and relates to a normal control operation, the control process proceeds from step S26 to the main routine shown in FIG. 8.

In the regenerative braking mode process shown in step S11, it is determined in step S31 in FIG. 10 whether the regenerative braking mode is set to the regular regenerative braking mode. In the first embodiment, there are only two regenerative braking modes; the regular regeneration mode and the brake regeneration mode. Therefore, in a circumstance of the regular regeneration mode, this decision is determined to be "YES", and the control process proceeds from step S31 to step S32. In step S32, the fixed duty FD for generating the first regenerative braking force BF1 is read from the fixed duty memory part 93. In step S33, the movement position M is loaded from the linear Hall element 55 of the brake sensor 53. In step S34, the variable duty CD according to the movement position M, for generating the second regenerative braking force BF2, is read from the variable duty memory part 94.

In step S35, the decision in regard to whether the variable duty CD at the movement position M has exceeded the fixed duty FD is used to determine whether the movement position M has exceeded the predetermined position. In a circumstance in which the variable duty CD at the movement position M has not exceeded the fixed duty FD, the control process proceeds from step S35 to step S36. In step S36, the assist motor 60 is controlled so that the fixed duty FD generates the first regenerative braking force BF1, and the flow returns to the main routine. If the variable duty CD at the movement position M exceeds the fixed duty FD, the control process proceeds from step S35 to step S37. In step S37, the assist motor 60 is controlled so that the variable duty CD that depends on the movement position M generates the second regenerative braking force BF2, and the flow returns to the main routine. Regenerative braking is thereby performed by the first regenerative braking force BF1 that is always uniform when the regular regeneration mode is engaged, until the lever member 31 is operated, as shown by a thick line in FIG. 11. When the lever member 31 reaches the predetermined position, regenerative braking is performed by the second regenerative braking force BF2 that becomes increasingly greater than the first regenerative braking force BF1 in accordance with the movement position M. Normally, the second regenerative braking force is set so that the movement position M before the front brake device 107f performs a braking operation, i.e., before a brake pad of the front brake device 107f comes into contact with the rim 121f of the front wheel 106f, corresponds to the predetermined position.

Meanwhile, in a circumstance in which it has been determined in step S31 that the regenerative braking mode is set to brake regeneration (i.e., if a decision of "NO" has been made in step S31), the control process proceeds from step S31 to step S38. In step S38, the movement position M is loaded from the linear Hall element 55 of the brake sensor 53. In step S39, the decision in regard to whether the movement position M is the initial position of "0" is used to determine whether the lever member 31 has moved from the initial position. If it is determined that the lever member 31 has not moved, the flow returns from step S39 to the main routine. If it is determined that the movement position M has become greater than the initial position and that the lever member 31 has moved, the control process proceeds from step S29 to step S37. The assist motor 60 is then controlled so that the variable duty CD that depends on the position of movement of the lever member 31 from the initial position generates the second regenerative braking force BF2. Regenerative braking is thereby performed by the second regenerative braking force BF2, which is represented in FIG. 11 by a thick line on the curve that extends from the initial position and that is represented by a thin line and a thick line when the brake regeneration mode is enabled.

In this circumstance, regenerative braking by the uniform first regenerative braking force BF1 is constantly performed irrespective of the state of the front brake mechanism 117f, and regenerative charging is performed on the power-storing part 14, which is the power source. When the front brake mechanism 117f shifts from the initial state to the braking state, i.e., when the lever member 31 moves from the initial state, regenerative charging is performed by the second regenerative braking force BF2, which is variable and increases gradually. Therefore, in the regenerative braking mode, it is possible to always perform regenerative charging by the first regenerative braking force BF1 when the bicycle is in motion, and during brake regeneration in which the front brake mechanism 117f is operating, to perform regenerative charging by the second regenerative braking force BF2 in which the braking force gradually increases. There is accordingly an increase in the amount of regenerative charging during brake regeneration, and it becomes possible to perform regenerative charging by brake regeneration in an efficient manner.

Also, since the second regenerative braking force BF2 is a large braking force when operation of the front brake mechanism 117f starts, a smooth transition can be made from regenerative braking to mechanical braking by the front brake mechanism 117f. There is accordingly a reduction in the likelihood of a sudden change in the braking force during transition from regenerative braking to mechanical braking.

Also, the movement position of the lever member 31 of the right brake lever 16f is detected by the brake sensor 53, and the assist motor 60 is controlled according to the movement position of the lever member 31. Therefore, it is possible to increase the second regenerative braking force BF2 in a smooth manner.

In the first embodiment, the second regenerative braking force BF2 of the brake regeneration mode is used, and a position at which the second regenerative braking force BF2, which increases with the set movement position M from the initial position, exceeds the first regenerative braking force BF1 is defined as the predetermined position. Therefore, even if the curve of the first regenerative braking force BF1 and the second regenerative braking force BF2 changes, the second regenerative braking force that becomes increasingly greater than the first regenerative braking force can always be obtained at the predetermined position. However, if the curve of the first regenerative braking force BF1 and the second regenerative braking force BF2 changes, the predetermined position changes.

In the second embodiment, a movement position M that has been set in advance is fixed to a predetermined position SM, and when the movement position M exceeds the predetermined position SM, the regenerative braking control part 74 controls the assist motor 60 so that a second regenerative braking force BF2 that becomes increasingly greater than the first regenerative braking force BF1 is generated. Therefore, the predetermined position SM can be configured so as to not vary, even if the curve of the first regenerative braking force BF1 and the second regenerative braking force BF2 changes.

Figure 12:
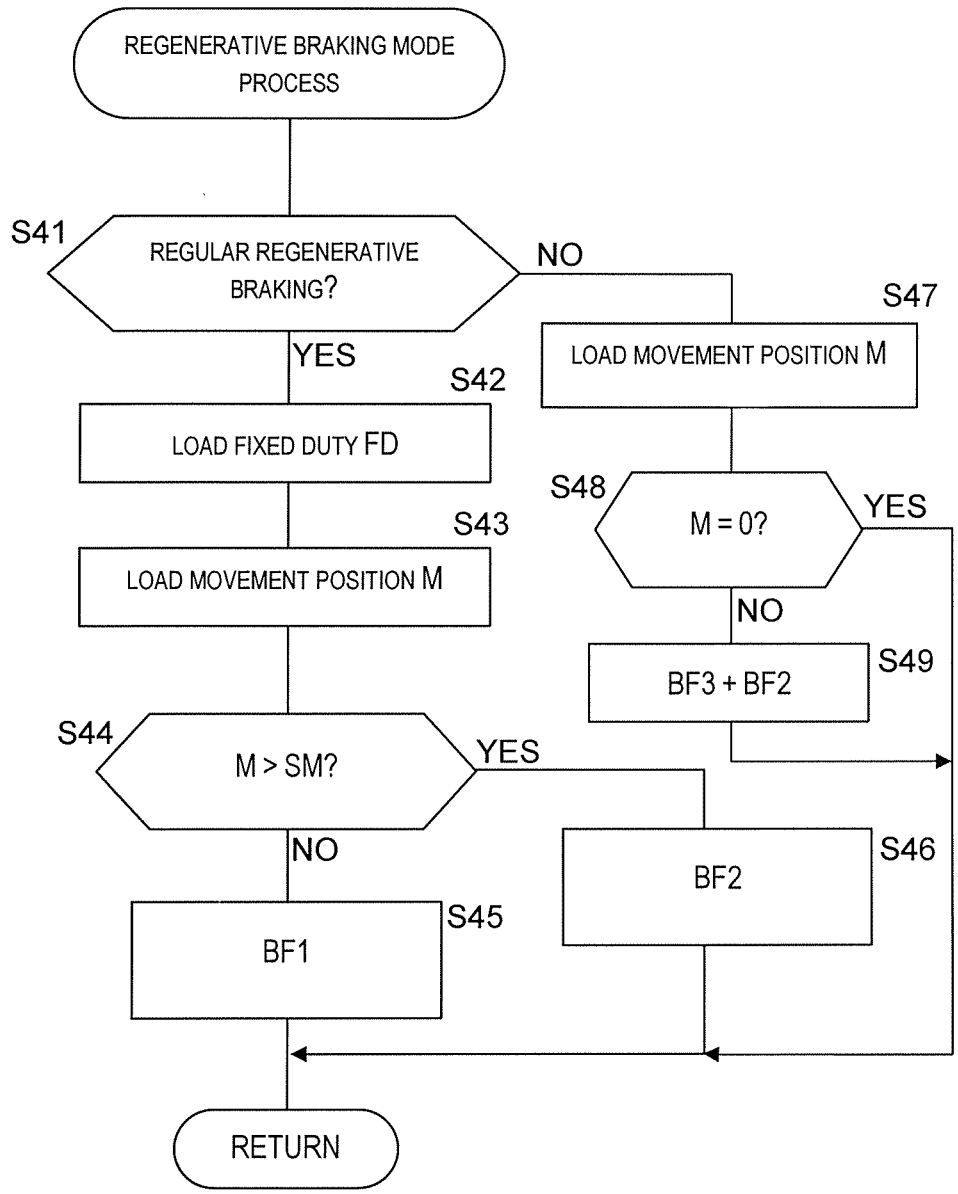
FIG. 12 is a flow chart showing a regenerative braking control operation executed by a bicycle regenerative brake control device according to a second embodiment.

In FIG. 12, in a regenerative braking mode process according to the second embodiment, it is determined in step S41 whether the regenerative braking mode is the regular regeneration mode. In the second embodiment too, there are only two regenerative braking modes; the regular regeneration mode and the brake regeneration mode. Therefore, in a circumstance of the regular regeneration mode, this decision is determined to be "YES", and the control process proceeds from step S41 to step S42. In step S42, the fixed duty FD for generating the first regenerative braking force BF1 is read from the fixed duty memory part 93. In step S43, the movement position M is loaded from the linear Hall element 55 of the brake sensor 53. In step S44, it is determined whether the movement position M has exceeded the predetermined position SM. In a circumstance in which the movement position M does not exceed the predetermined position SM, the control process proceeds from step S44 to step S45. In step S45, the assist motor 60 is controlled so that the fixed duty FD generates the first regenerative braking force BF1, and the flow returns to the main routine.

If the movement position M exceeds the predetermined position SM, the control process proceeds from step S44 to step S46. In step S46, the assist motor 60 is controlled so that the variable duty CD generates the second regenerative braking force BF2.

Figure 13:
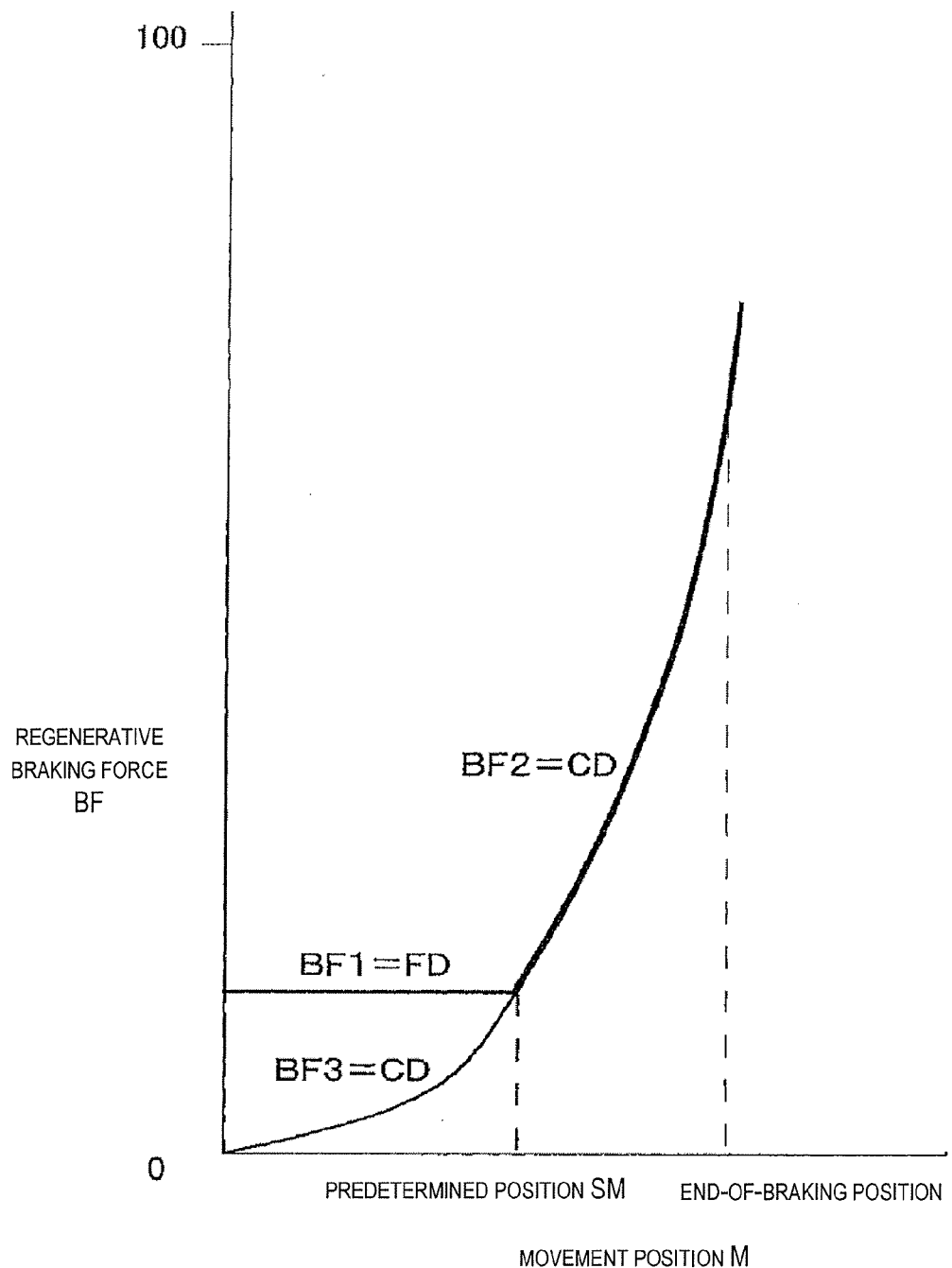
FIG. 13 is a graph showing a change in the regenerative braking force during brake regeneration and during regular regeneration according to the second embodiment.

As shown in FIG. 13, the variable duty CD is configured so as to become increasingly greater than the fixed duty FD when the movement position M of the lever member 31 moves from the predetermined position SM. For example, the duty ratio for each movement position M, calculated according to a function of the movement position M in which the fixed duty FD is an initial value, is stored in the variable duty memory part 94. A duty ratio for each movement position M from the initial position to the predetermined position SM, for generating a variable third regenerative braking force BF3, is also calculated and stored in the variable duty memory part 94. The third regenerative braking force BF3 is used in the brake regeneration mode.

In a circumstance in which the regenerative braking mode is set to brake regeneration, the control process proceeds from step S41 to step S47 in FIG. 12. In step S47, the movement position M is loaded from the linear Hall element 55 of the brake sensor 53. In step S48, it is determined, from whether the movement position M is the initial position of "0", whether the lever member 31 has moved from the initial position. If it is determined that the lever member 31 has not moved, the flow returns from the step S48 to the main routine. If it is determined that the movement position M is greater than the initial position and that the lever member 31 has moved, the control process proceeds from step S48 to step S49. Also, the assist motor 60 is controlled between the initial position and the predetermined position SM so that the variable duty CD, which varies according to the movement position M of the lever member 31, generates the variable third regenerative braking force BF3. When the predetermined position SM is exceeded, the assist motor 60 is controlled so that the variable duty CD, which varies according to the movement position M of the lever member 31, generates the variable second regenerative braking force BF2. Regenerative braking is thereby performed by the third regenerative braking force and the second regenerative braking force BF2 represented in FIG. 13 by a thick line on the curve extending from the initial position and represented by a thin line and a thick line when the brake regeneration mode is enabled.

Although two embodiments of the present invention has been described above, the present invention is not limited in scope thereby; a variety of modifications being possible without departing from the scope of the invention.

(a) Although in the first and second embodiments described above, the curve representing the variable duty CD is a curve having a rate of increase that grows with increasing movement position M, the variable duty CD according to the present invention is not limited to such a curve. The variable duty CD according to the present invention is not limited to the curve shown in FIG. 11, and may be a straight line that is proportional to the movement position M, or may be a curve having a rate of increase that starts to fall with increasing movement position M.

(b) The above embodiments disclose a brake mechanism comprising a brake lever and a brake device connected by a brake cable. However, this does not limit the scope of the present invention. For example, the present invention can be applied to a brake mechanism comprising a brake lever and a brake device connected by hydraulic piping. In a circumstance in which hydraulic piping is used, the hydraulic pressure may be detected, and regenerative control performed according to the pressure. Also, in the above embodiments, regenerative control is performed according to the position of movement of the lever part of the brake lever. However, regenerative control may also be performed according to the position of movement of a brake shoe, and regenerative control may also be performed according to the position of movement of a part of the brake cable.

(c) In the above embodiments, the regenerative braking force is controlled by operation of the front brake mechanism 117f in the regular regeneration mode and the brake regeneration mode. However, the variable regenerative braking force may be controlled by operation of the rear brake mechanism 117r. Also, in the above embodiments, regenerative control is performed according to the position of movement of the right brake lever 16f. However, regenerative control may be performed according to the position of movement of the left brake lever 16r.

(d) In the above embodiments, the present invention was described using an example of a power-assisted bicycle in which a motor unit 10 is provided to the front wheel 106f. However, this does not limit the scope of the present invention. For example, the present invention can be applied to a power-assisted bicycle in which a motor unit is provided to the rear wheel 106r or the hanger part 122. In such a circumstance, a variable regenerative braking force may be controlled by operation of the rear brake mechanism 117r.

(e) The above embodiments were configured so that a variable regenerative braking force continues to be applied, even while mechanical braking is being applied by the brake mechanism, until the lever member moves to an end-of-braking position. However, this does not limit the scope of the present invention. For example, regenerative braking may be terminated, or the regenerative braking force may be made uniform or caused to increase at a rate that is different from that before the start of braking, when mechanical braking is started.

The position at which mechanical braking is started may be determined according to the change in speed of movement of the lever member 31. For example, since the speed of movement of the lever member falls at the start of mechanical braking, the travel speed may be detected from the change in movement position relative to time, and mechanical braking determined to have started when the speed falls to a predetermined speed or less. The regenerative braking force may be caused to change when mechanical braking is determined to have started.

Also, at the start of mechanical braking by the brake device, the rider may also stop movement of the lever member 31 at the position at which mechanical braking is to start, and use a predetermined operation (e.g., pressing and holding a switch or a similar device) to set the corresponding movement position M as the position at which braking is to start.

(f) In the above embodiments, the movement position of the lever member is detected. However, the amount of movement of the lever member from the initial position may be detected, and the regenerative control part may perform regenerative control according to the detected movement amount.

(g) In the above embodiment, the power-assisted bicycle is configured so as to have an externally installed shift transmission. However, a configuration in which an internally installed shift transmission is provided, or a configuration in which no shift transmission is provided, is also possible. The present system can be applied to all types of power-assisted bicycles.

(h) In the above embodiment, the variable duty CD is stored in the variable duty memory part 94 in table format. However, this does not limit the scope of the present invention. For example, the variable duty CD may be obtained by continually performing calculations according to the movement position.

Thus, the foregoing descriptions of the embodiments according of bicycle regenerative brake control device are provided for illustration only, and not for the purpose of limiting the invention as defined by the appended claims and their equivalents.

What is claimed is:

1. A bicycle regenerative brake control device for controlling a motor, in relation to a brake mechanism that can be mounted on an electric bicycle in which human-powered driving is assisted by the motor, the bicycle regenerative brake control device comprising:
   a first control part that controls the motor so as to generate a uniform first regenerative braking force;
   a second control part that controls the motor so as to generate a gradually increasing second regenerative braking force upon determining the brake mechanism shifts from an initial state to a braking state; and
   a switch control part that switches to a control performed by the second control part in response to the brake mechanism shifting from the initial state to the braking state while control is being performed by the first control part.

2. The bicycle regenerative brake control device according to claim 1, wherein
   the second control part is configured to control the motor according to operation of a bicycle brake lever as the brake mechanism.

3. The bicycle regenerative brake control device according to claim 1, further comprising
   a mode switch part that switches between a first braking mode and a second braking mode, the first braking mode being performed such that the first control part generates the uniform first regenerative braking force until the brake mechanism shifts from the initial state to the braking state and then the switch control part switches to the control performed by the second control part, and the second braking mode being performed such that no regenerative braking is performed until the brake mechanism shifts from the initial state to the braking state and then the switch control part switches to the control performed by the second control part.

4. The bicycle regenerative brake control device according to claim 2, further comprising
   a movement position detecting part that detects a movement position of the brake lever from an initial position; and
   a position determining part that determines whether the movement position of the brake lever from the initial position has exceeded a predetermined position;
   the switch control part controlling the motor so that the first control part generates the first regenerative braking force until the movement position of the brake lever exceeds the predetermined position, and controlling the motor so that the second control part generates the second regenerative braking force when the movement position of the brake lever exceeds the predetermined position.

5. The bicycle regenerative brake control device according to claim 4, wherein
   the second control part is configured to control the motor so that the second regenerative braking force gradually increases according to the movement position of the brake lever from the initial position.

6. The bicycle regenerative brake control device according to claim 4, wherein
   the position determining part is configured to determine the movement position of the brake lever at which the second regenerative braking force exceeds the first regenerative braking force as the predetermined position.

7. The bicycle regenerative brake control device according to claim 4, wherein
   the second control part is configured to control the motor so that the second regenerative braking force becomes increasingly greater than the first regenerative braking force according to at least the movement position of the brake lever from the predetermined position.

8. The bicycle regenerative brake control device according to claim 2, further comprising
   a mode switch part that switches between a first braking mode and a second braking mode, where the switch control part switches from a control performed by the first control part to the control performed by the second control part upon determining the brake mechanism shifts from the initial state to the braking state while in the first braking mode, and where a control is performed by the second control part upon determining the brake mechanism shifts from the initial state to the braking state while in the second braking mode.

9. The bicycle regenerative brake control device according to claim 8, further comprising a movement position detecting part that detects a movement position of the brake lever from an initial position; and a position determining part that determines whether the movement position of the brake lever from the initial position has exceeded a predetermined position;

the switch control part controlling the motor so that the first control part generates the first regenerative braking force until the movement position of the brake lever exceeds the predetermined position, and controlling the motor so that the second control part generates the second regenerative braking force when the movement position of the brake lever exceeds the predetermined position.

10. The bicycle regenerative brake control device according to claim 9, wherein the second control part is configured to control the motor so that the second regenerative braking force gradually increases according to the movement position of the brake lever from the initial position.

11. The bicycle regenerative brake control device according to claim 9, wherein the position determining part is configured to determine the movement position of the brake lever at which the second regenerative braking force exceeds the first regenerative braking force as the predetermined position.

12. The bicycle regenerative brake control device according to claim 9, wherein the second control part is configured to control the motor so that the second regenerative braking force becomes increasingly greater than the first regenerative braking force according to at least the movement position of the brake lever from the predetermined position.

* * * * *